United States Patent [19]
Flores-Garza

[11] Patent Number: 5,660,620
[45] Date of Patent: Aug. 26, 1997

[54] WATERPROOFING COMPOSITION

[76] Inventor: Rogelio Flores-Garza, Guerrero Sur 447, Saltillo, Coahuila, Mexico, 25000

[21] Appl. No.: 609,556

[22] Filed: Mar. 1, 1996

[30] Foreign Application Priority Data

Mar. 3, 1995 [MX] Mexico ................................. 951208

[51] Int. Cl.$^6$ ................................................. C04B 7/02
[52] U.S. Cl. ................... 106/2; 106/486; 106/734; 106/736; 106/737; 106/738; 106/793; 106/794
[58] Field of Search ................................. 106/738, 737, 106/736, 734, 793, 794, 2, 486; 501/144

[56] References Cited

U.S. PATENT DOCUMENTS

| | | | |
|---|---|---|---|
| 2,170,163 | 8/1939 | Smith | 106/734 |
| 2,890,965 | 6/1959 | Underdown | 106/734 |
| 3,139,351 | 6/1964 | Hammer | 106/738 |

*Primary Examiner*—Paul Marcantoni
*Attorney, Agent, or Firm*—Ladas & Parry

[57] ABSTRACT

The present invention refers to a waterproofing composition to be applied on any surface desired to be protected or on damaged surfaces in order to avoid moisture or water leakages to the inside of the rooms. The composition comprises or consists essentially of 30 to 40% Portland cement or Kaolin; 20 to 30% marble dust or silica sand, 25 to 35% lime and 3 to 12% ground salt, alum stone or calcium chloride. The resulting talcum texture powder is mixed with water and applied as paint.

4 Claims, No Drawings

WATERPROOFING COMPOSITION

BACKGROUND OF THE INVENTION

In the technical field related to the present invention, a wide range of waterproofing compositions are known, that comprise different materials, such as waste plastic materials, thinner, gasoline, diaphanous oil. That is the case of the composition protected by Mexican Patent No. 154210. Other compositions are made of acrylic resins, catalysts, solvents and also fungicides and pH regulators and solids that when mixed form a waterproofing and thermal isolation composition like the one disclosed in Mexican Patent Application No. 9302430 which was published in the 1993 Mexican Gazette. Other waterproofing compositions like that described in the Mexican Certificate of Invention 3800 are characterized by being made of styrene-butadiene, and acrylonitrile-styrene copolymers, an acrylonitrile-butadiene-styrene ter-polymer, styrene monomers, methacrylic acid esters, vinyltoluene, tetrachlorphtalic anhydride and others.

Nevertheless, none of the aforementioned compositions is made of with the same ingredients forming the composition subject of this application, since the present composition is not made of with asphalt or oil derivative resins.

Also, the constitution of the present compositions is such that when mixing said composition with water, it can be applied in such an easy manner as a paint.

It is also very common and well known that the application of the waterproofing agents of the prior art is a very tiring and time consuming task, specially because of the thick texture of the common waterproofing agents. Normally this compositions do not include a reflecting solution, therefore, it is necessary to apply a material of said type once the waterproofing agent has been applied. Evidently this means the execution of two separate stages, one after another, which represent an additional procedure to the application of the waterproofing agent and an additional expenditure in material and manual labor.

OBJECTIVE OF THE INVENTION

It is one object of the present invention to propose a new waterproofing composition, which because of its ingredients results in a powder composition, which makes possible that upon mixing same, with water a paint type product is obtained, which allows to perfectly fill any crack or fissure as small as it may be.

Another object of this invention is to present a new waterproofing composition which from origin includes a reflecting element so that when applying said composition, besides the waterproofing coating a suitable layer is obtained, which serves to avoid the absorption of high temperatures that affect common waterproofing agents, causing cracks in slabs and walls because of overheating.

DETAILED DESCRIPTION OF THE PREFERRED EMBODIMENT OF THE INVENTION

It is disclosed a waterproofing composition that does not contain asphalt or oil derived resins, which is made of limestones, silica sands, titanium and natural transition polymers, of white color, resulting in a composition with a powder texture similar to talcum. A predetermined percentage of water is added to said composition in such a way that the final composition has the consistency of a paint and it is applied in the same manner as a paint to the surface to be waterproofed.

In the preferred modality, although not necessarily the only possible one, will be elucidated from the formula described below, the composition comprises or consists essentially of the following ingredients: 30 to 40% Portland cement, e.g., white cement, or kaolin, 20 to 30% marble dust or silica sand, 25 to 35% lime and 3 to 12% ground salt (NaCl)sodium chloride, alum stone or $CaCl_2$.

The preparation of the waterproofing composition is made mixing the aforementioned ingredients and the final paint type product is produced after adding water in a proportion of two liters of water per kilogram of the powdered composition.

EXAMPLES

The following composition was prepared with the following materials and weights thereof: 9.6 kg Portland cement, 6.8 kg marble dust, 7.5 kg lime and 1.5 kg ground salt. All these ingredients were mixed in order to obtain a white product having texture similar to talcum. In addition, approximately 8 kg of the prepared composition were diluted in water in a proportion of 2 liters per kg; that is in a ratio of about 2:1. Because of the powdered nature of the product, upon mixing it with water, the dilution has to be continually stirred in order to avoid sedimentation, obtaining in this manner the optimal homogenization and texture. Once this conditions are attained, one can proceed to apply the waterproofing agent using the same procedure as with paint on the damaged surfaces to be repaired.

Due to its light density, the waterproofing agent enters easily into fractures and pores of the surface forming part of the original concrete and absolutely sealing the surface. In those cases where the surface to be repaired has fractures or cracks of a considerable size, these shall be replastered with the same material of the described composition, before applying the first layer of the sealing agent.

In some special cases, for example, battlements and its junctures with the slabs, it is recommended to apply the waterproofing agent thoroughly since in the juncture of the battlements and slabs, moisture can filter into the walls and other structural elements of the building. Besides, in every case, it is recommended to clean thoroughly the surface where the waterproofing agent will be applied.

In those cases where the surface or slab, where the waterproofing agent will be applied, already include another waterproofing material made of asphalt, tar, etc., this shall be removed in order to obtain a clean surface for the application of the new waterproofing agent with the desired results.

It will be evident for those skilled in the art that, from the above mentioned composition, other variants can be obtained by substituting some of the ingredients with other ingredients having the same properties or characteristics, so that any change shall be necessarily understood as forming part of the scope of the inventive concept described here.

We claim:

1. A waterproofing and sealing composition comprising the following elements: 30 to 40% Portland cement or Kaolin; 20 to 30% marble dust or silica sand, 25 to 35% lime and 3 to 12% sodium chloride, alum stone or calcium chloride.

2. A waterproofing and sealing composition which consists essentially of the following elements: 30 to 40% Portland cement or Kaolin; 20 to 30% marble dust or silica sand, 25 to 35% lime and 3 to 12% sodium chloride, alum stone or calcium chloride.

3. A waterproofing and sealing composition according to claim 1, which comprises the Portland cement, the marble dust, the lime and the sodium chloride.

4. A waterproofing and sealing composition according to claim 2, which consists essentially of the Portland cement, the marble dust, the lime and the sodium chloride.

* * * * *